No. 763,705. PATENTED JUNE 28, 1904.
A. F. WALZ & M. DOHERTY.
HEATING APPARATUS.
APPLICATION FILED OCT. 31, 1902.
NO MODEL.
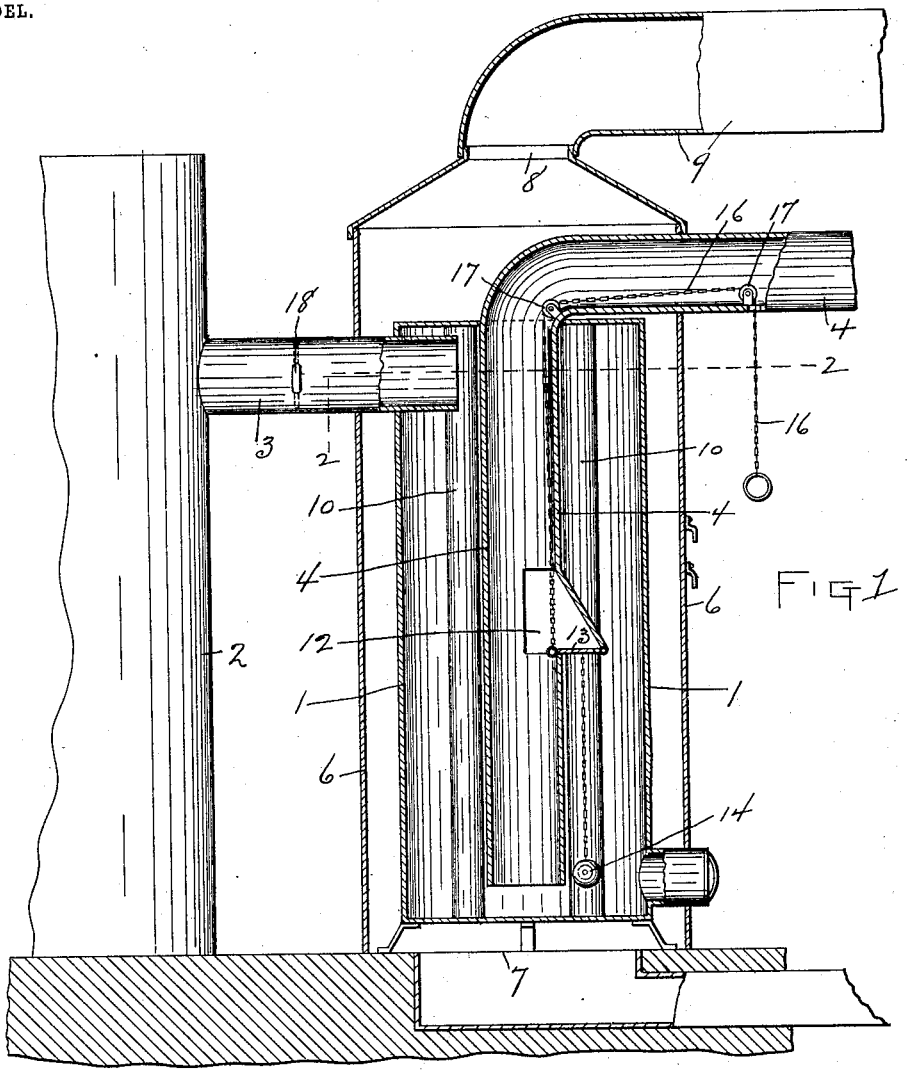
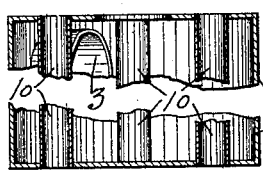
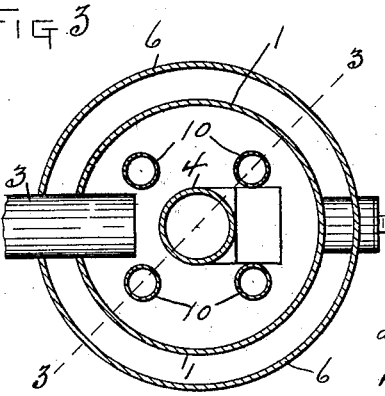
WITNESSES
Wm J. Greer
E. M. O'Reilly.
INVENTORS
Adolph F. Walz
and Michael Doherty
By Mosher & Curtis
Attys.

No. 763,705. Patented June 28, 1904.

UNITED STATES PATENT OFFICE.

ADOLPH F. WALZ AND MICHAEL DOHERTY, OF TROY, NEW YORK, ASSIGNORS TO SAID WALZ.

HEATING APPARATUS.

SPECIFICATION forming part of Letters Patent No. 763,705, dated June 28, 1904.

Application filed October 31, 1902. Serial No. 129,567. (No model.)

*To all whom it may concern:*

Be it known that we, ADOLPH FREDERICK WALZ and MICHAEL DOHERTY, citizens of the United States, residing at Troy, county of Rensselaer, and State of New York, have invented certain new and useful Improvements in Heating Apparatus, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 1 of the drawings is a central vertical longitudinal section of our improved heating apparatus, showing the same in connection with a furnace. Fig. 2 is a horizontal section of the same, taken on the broken line 2 2 in Fig. 1. Fig. 3 is a central vertical section of the same, taken on the broken line 3 3 in Fig. 2 with the inclosing case and outlet-pipe removed and the middle portion of the drum and air-tubes broken away.

The objects and nature of the invention will appear in connection with the following description.

The heating-drum 1 is vertically arranged near a furnace 2, the smoke-pipe 3 of which is extended through the upper part of the drum-wall interiorly of the drum and is open thereat, as shown in Fig. 1. The outlet-pipe 4 extends centrally through the drum to a point near the lower end thereof, being open thereat interiorly of the drum. The parts are so arranged that the open end of the smoke-pipe 3, which forms the inlet for the drum, is located opposite and in proximity to the upper part of the outlet-pipe, so that the heated gaseous products of combustion are directed immediately against the exterior of the outlet-pipe to heat the same before their temperature has been lowered by contact with the walls of the drum. The gaseous matter within the outlet-pipe being thus heated rises therein, causing an updraft through the outlet-pipe and tending to create a vacuum in the lower part of the drum. The heated gaseous products of combustion entering the drum through the pipe 3 are divided and deflected by contact with the outlet-pipe 4 and are brought into contact with the walls of the drum to heat the same. The reduction in temperature of such gaseous products, due to contact with the drum-wall, and the partial vacuum caused by the updraft through the outlet-pipe 4 cause such gaseous products to descend to the lower part of the drum, whence they pass upwardly through the open lower end of the outlet-pipe 4 and thence through the outlet-pipe to the chimney, (not shown,) with which said outlet-pipe is connected. The drum is preferably arranged within an inclosing casing 6, having at its lower end an air-intake 7 and at its upper end an air-outlet 8, from which a hot-air pipe 9 leads to any desired point of delivery, as a hot-air register. (Not shown.) The drum may also be provided with air-tubes 10, extending vertically therethrough from the lower end of the inclosure formed by the casing 6 to the upper end thereof. Cold air entering the inclosure through the intake 7 passes upwardly through the air-tubes 10 and between the drum and casing, being heated by contact with the heated drum and tubes, and escapes from the upper end of the inclosure through the pipe 9.

If desired, the outlet-pipe may be provided with an aperture 12, communicating with the interior of the drum at any desired height above the open end of said pipe, which aperture may be closed and controlled by a valve or damper 13. As shown, the valve 13 is held to its seat by means of the weight 14 and may be opened by means of the chain 16, connected therewith and passing over guide-pulleys 17. By opening the damper 13, the gaseous products of combustion are permitted to pass by a more direct route through the drum and outlet-pipe. By extending the chain 16 over guide-pulleys 17 within the outlet-pipe to a point beyond the casing of the heating-drum we are able to lead said chain exteriorly of the drum without forming openings for the passage of the chain through either the drum or its casing.

The furnace 2 may be of any form of fuel-burner, and, if desired, the smoke-pipe may be provided with a damper 18.

The smoke-pipe 3 and outlet-pipe 4 pass directly through the casing 6 and drum-wall.

If desired, the casing 6 may be omitted and the drum used as a radiator in a room.

What we claim as new, and desire to secure by Letters Patent, is—

In a heating apparatus, the combination with a vertically-arranged drum; of an outlet-pipe extending centrally therethrough to the lower part thereof and provided at its lower end and in an upper part thereof with apertures respectively opening interiorly of the drum; a valve for controlling said upper aperture; a valve-operating chain extending within the outlet-pipe to a point outside said casing whereat said pipe is provided with an outlet-aperture for said chain; means for guiding said chain; and an inlet in the upper part of the drum opposite and in proximity to the upper part of the outlet-pipe, substantially as described.

In testimony whereof we have hereunto set our hands this 29th day of October, 1902.

ADOLPH F. WALZ.
MICHAEL DOHERTY.

Witnesses:
 GEO. A. MOSHER,
 E. M. O'REILLY.